(12) United States Patent
de Lescure et al.

(10) Patent No.: US 12,348,382 B2
(45) Date of Patent: *Jul. 1, 2025

(54) INCREMENTAL TOPOLOGY MODIFICATION OF A NETWORK-ON-CHIP

(71) Applicant: ARTERIS, INC., Campbell, CA (US)

(72) Inventors: Benoit de Lescure, Campbell, CA (US); Moez Cherif, Santa Cruz, CA (US)

(73) Assignee: ARTERIS, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/631,033

(22) Filed: Apr. 9, 2024

(65) Prior Publication Data

US 2024/0259274 A1  Aug. 1, 2024

Related U.S. Application Data

(63) Continuation of application No. 17/686,364, filed on Mar. 3, 2022, now Pat. No. 11,956,127.

(60) Provisional application No. 63/158,890, filed on Mar. 10, 2021.

(51) Int. Cl.
*H04L 41/14* (2022.01)
*G06F 15/78* (2006.01)

(52) U.S. Cl.
CPC ........ *H04L 41/145* (2013.01); *G06F 15/7825* (2013.01)

(58) Field of Classification Search
None
See application file for complete search history.

(56) References Cited

U.S. PATENT DOCUMENTS

| | | | | |
|---|---|---|---|---|
| 2010/0274785 | A1* | 10/2010 | Procopiuc | G06F 16/22 707/E17.046 |
| 2015/0036536 | A1* | 2/2015 | Kumar | H04L 45/06 370/254 |
| 2015/0254325 | A1* | 9/2015 | Stringham | G06F 16/9535 707/737 |
| 2017/0060204 | A1* | 3/2017 | Gangwar | G06F 1/26 |

* cited by examiner

*Primary Examiner* — Fadi Haj Said
(74) *Attorney, Agent, or Firm* — Dana Legal Services; Jubin Dana

(57) ABSTRACT

An initial Network on Chip (NoC) topology based on a set of initial requirements is incrementally modified to satisfy a set of different requirements. Each incremental modification includes minimizing a number of changes to existing components in the initial topology. Minimizing the changes includes preserving names of the existing components in the initial NoC topology.

1 Claim, 8 Drawing Sheets

INCREMENTAL TOPOLOGY MODIFICATION OF A NETWORK-ON-CHIP

CROSS REFERENCE TO RELATED APPLICATION

This application is a continuation of U.S. Non-Provisional application Ser. No. 17/686,364 filed on Mar. 3, 2022 by Benoit deLESCURE and Moez CHERIF, which issues on Apr. 9, 2024 as U.S. Pat. No. 11,956,127 which claims priority from a provisional application U.S. 63/158,890 filed on Mar. 10, 2021 entire disclosures of which are incorporated herein by reference.

FIELD

The present technology is in the field of system design and, more specifically, related to topology synthesis to generate a network-on-chip (NoC) description.

BACKGROUND

Multiprocessor systems have been implemented in systems-on-chips (SoCs) that communicate through special networks used to handle communication between Intellectual Property (IP) units of SoCs. One example of a special network is a network-on-chip (NoC). A typical SoC includes instances of sources or initiators IPs and sinks or target IPs. Transactions are sent from an initiator to one or more targets using industry-standard protocols. The initiator, connected to the NoC, sends a request transaction to a target, using an address to select the target. The NoC decodes the address and transports the request from the initiator to the target. The target handles the transaction and sends a response transaction, which is transported by the NoC back to the initiator.

Typically, during design, a synthesis tool generates a NoC description based on a set of requirements. The result has been processed through the ASIC design flow with logic synthesis and place and route steps performed. The steps typically take a lot of time, e.g., multiple days.

After this first generation, it is decided to remove a component from the SoC, which results in a slight modification of the floorplan and the connectivity in light of the impact on the set of requirements. The synthesis tool generating the NoC topology is run again with the updated requirements. The tool gives a completely different result compared to the first run. As such, all the previous work on logic synthesis and place and route needs to be performed again from scratch, even if the modification was very small. This is very costly.

When designing large SoCs that contain one or more NoCs, the designer may have to perform the configuration of the NoC topology iteratively, doing numerous small changes as the design progresses. Examples of the changes include adding or removing components connected to the NoC; changing the logical connectivity between source and sinks of traffic in the NoC; changing parts of the floorplan resulting in new physical constraints for the NoC implementation, such as new blockages or new free space to place the logic elements that compose the NoC on the chip; and changing the required performance, for instance modifying the required minimum bandwidth between a source and a sink, or changing the clock frequency of some elements, or changing the path width of some elements.

When such changes need to be made, the changes have an impact on the NoC topology, which is no longer fulfilling the new requirements. The existing NoC topology is modified to account for the changes or the new needs/requirements. While doing so, an attempt will be made to minimize the number of changes in the NoC to preserve implementation so that parts that are not impacted by the changes remains minimally modified. For instance, attempts will be made to preserve implementations of existing logic synthesis and/or place and route. This task is difficult and error prone.

There is a need for a tool that takes, as input, the existing NoC topology and updated requirements to generate a modified NoC topology that fulfills the updated requirements.

SUMMARY

In accordance with various embodiments and aspects herein, systems, methods and computer-readable media take, as input, an existing NoC topology and generate an updated NoC topology that fulfills updated/new requirements, yet minimizes delays and errors that result from incremental synthesis runs, such as two consecutive synthesis runs, when there is an update/new requirement.

DETAILED DESCRIPTION

The following describes various examples of the present technology. Generally, examples can use the described aspects in any combination. All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," "various embodiments," or similar language means that a particular aspect, feature, structure, or characteristic described in connection with the embodiment is included in at least one embodiment.

As used herein, a "source" and an "initiator" refer to similar intellectual property (IP) modules or units and the terms are used interchangeably within the scope and embodiments. As used herein, a "sink" and a "target" refer to similar IP modules or units and the terms are used interchangeably within the scope and embodiments. As used herein, a transaction may be a request transaction or a response transaction. Examples of request transactions include write request and read request.

Thus, appearances of the phrases "in one embodiment," "in at least one embodiment," "in an embodiment," "in certain embodiments," and similar language throughout this specification may but do not necessarily, all refer to the same embodiment or similar embodiments. Furthermore, aspects and embodiments described herein are merely exemplary, and should not be construed as limiting of the scope or spirit of the invention as appreciated by those of ordinary skill in the art. All statements herein reciting principles, aspects, and embodiments are intended to encompass both structural and functional equivalents thereof. It is intended that such equivalents include both currently known equivalents and equivalents developed in the future. Furthermore, to the extent that the terms "including", "includes", "having", "has", "with", or variants thereof are used in either the detailed description and the claims, such terms are intended to be inclusive in a similar manner to the term "comprising."

Figure 1:
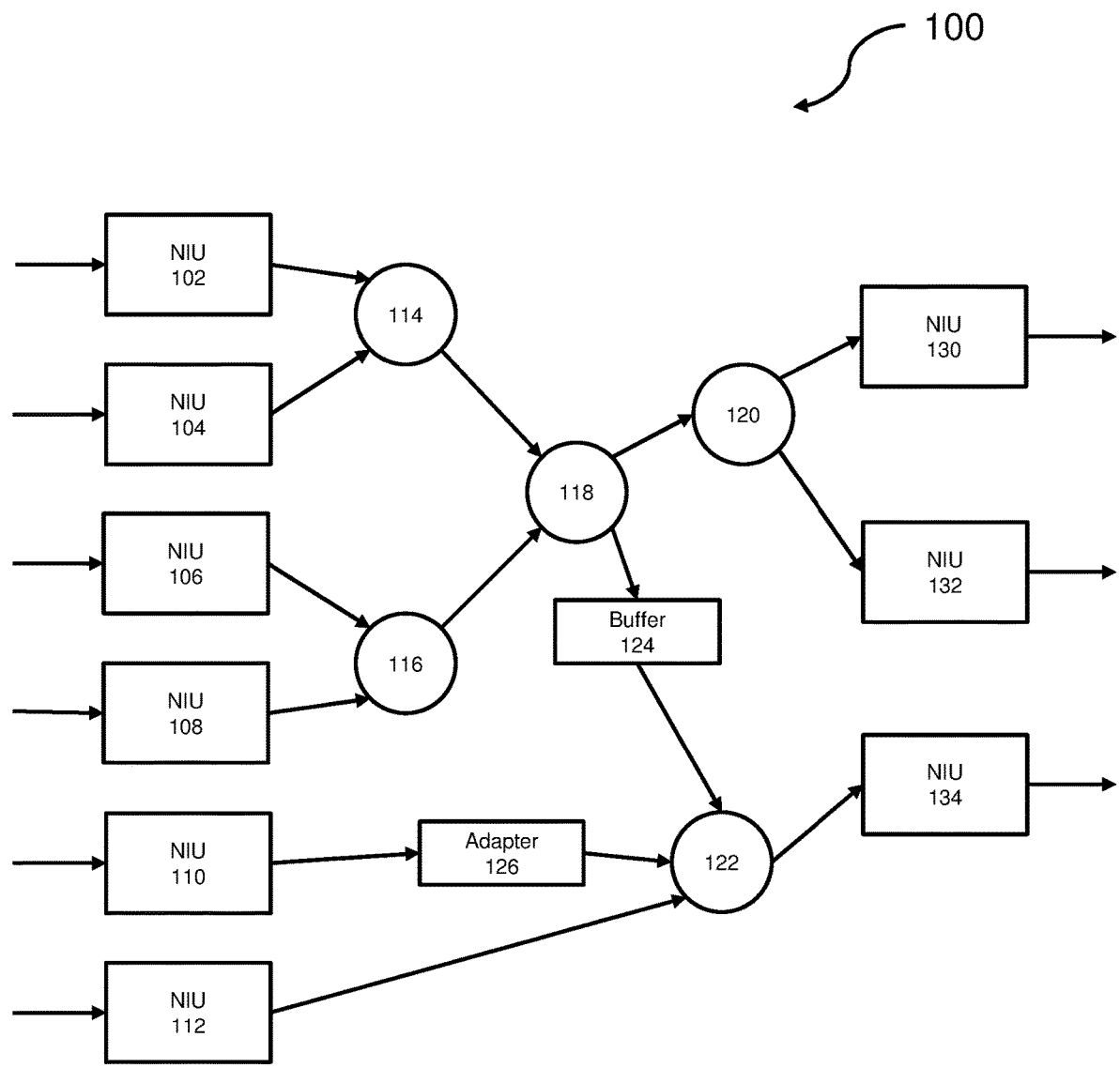
FIG. 1 shows a logic view of a network-on-chip (NoC) that includes various elements in accordance with various aspects and embodiments of the invention.

Referring now to FIG. 1, an example of a network-on-chip (NoC) 100 is shown. The NoC 100 uses elementary network functions that are assembled, such as network interface units (NIUs) 102,104,106,108, 110, 112, 130, 132, and 134, switches 114, 116, 118,120, and 122, adapters 126, and buffers 124. Elementary network functions of the NoC 100 may use an internal transport protocol, which is specific to the NoC 100, to communicate with each other, typically based on the transmission of packets. The NIUs 102,104, 106,108, 110, 112, 130, 132, and 134 convert the protocol used by the attached system-on-chip (SoC) unit (not shown), into the transport protocol used inside the NoC 100. The switches 114, 116, 118,120, and 122 route flows of traffic between source and target destinations. The buffer 124 is used to insert pipelining elements to span long distances, or to store packets to deal with rate adaptation between fast senders and slow receivers or vice-versa. The adapter 126 handles various conversions between data width, clock, and power domains. The NoC 100 may be implemented in an SoC with digital logic, such as logic gates and sequential elements (flip-flops).

Figure 2:
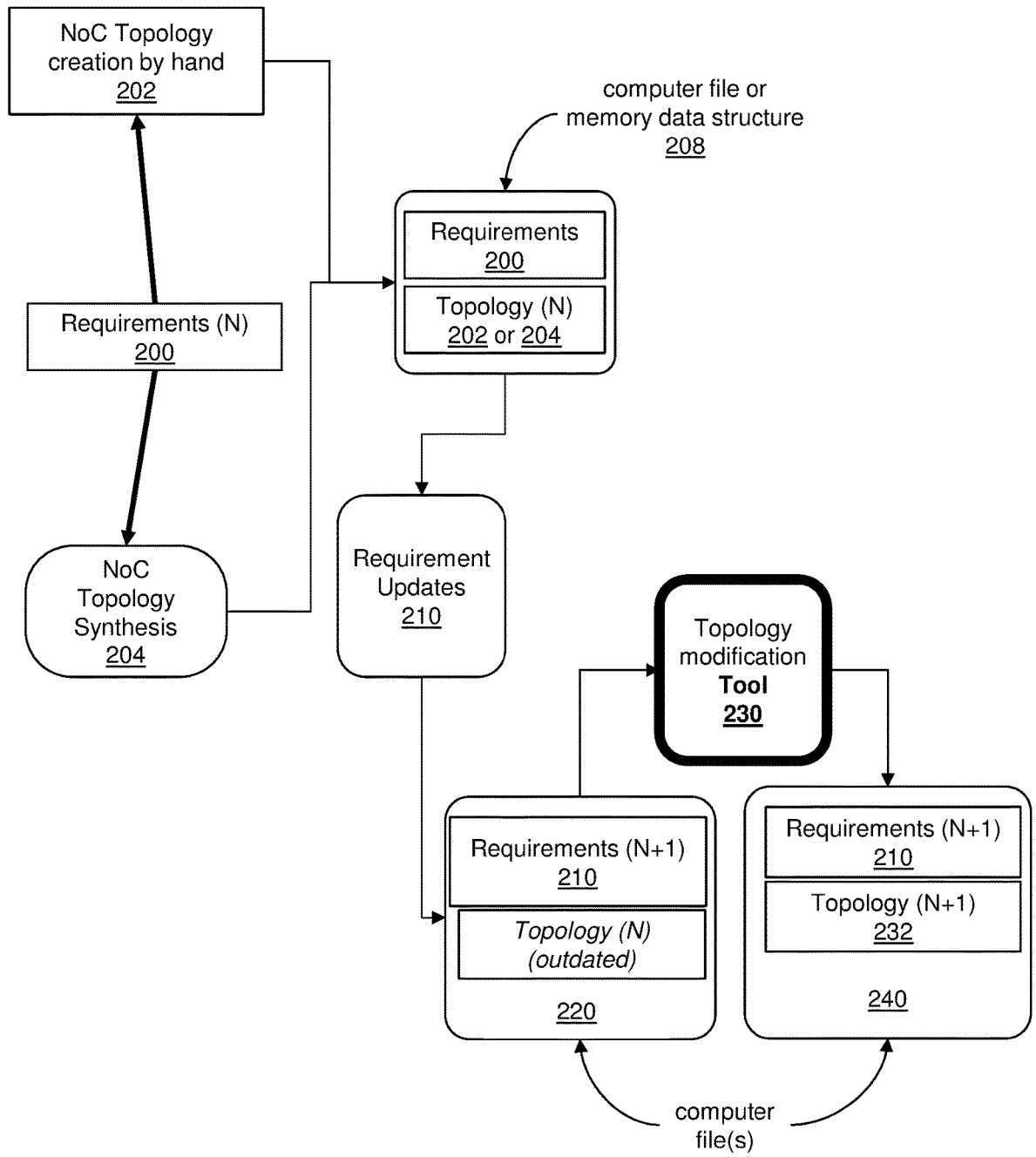
FIG. 2 shows a process for modifying an existing NoC topology to fulfill updated requirements in accordance with various aspects and embodiments of the invention.

Referring now to FIG. 2, a process is shown for modifying an existing topology of a NoC. Initial requirements (N) 200 of the NoC are provided as input. Based on the initial requirements (N) 200, a corresponding NoC topology 202 or 204 that satisfies these initial requirements 200 is provided or created. In some embodiments, the NoC topology 202 is created by hand, such as by a designer. In some embodiments, the NoC topology 204 is automatically created using a NoC topology synthesis module or tool. Both the initial requirements 200 and the corresponding NoC topology 202 or 204 are described in a computer readable representation 208, such as computer files or in-memory data structures.

The initial requirements 200 are updated (e.g., updated, new, and/or revised), resulting in updated requirements 210. The existing NoC topology 202 or 204 is now outdated, as it does not satisfy the updated requirements (N+1) 210. The updated requirements (N+1) 210 and the now outdated existing NoC topology 202 or 204 are again made available in a computer readable representation 220, such as computer files or in-memory data structures.

A topology modification tool 230 receives the updated requirements 210 and the existing NoC topology represen-tation 202 or 204 and modifies the outdated existing NoC topology representation 202 or 204 to generate a NoC topology representation 232 that satisfies the updated requirements 210.

Figure 3:
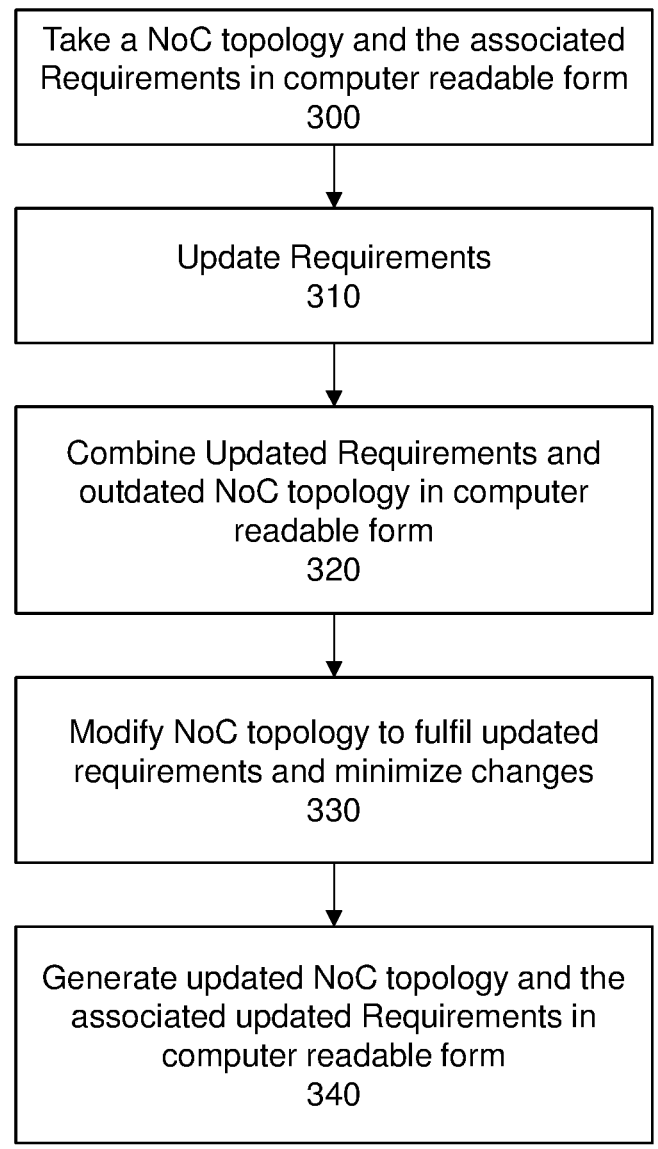
FIG. 3 shows a process used by a topology modification tool for updating a NoC topology in accordance with various aspects and embodiments of the invention.

Referring additionally to FIG. 3, a process is shown, that is used by the topology modification tool 230 for generating the updated NoC topology 232 that is associated with the updated requirements 210. At step 300 an NoC topology 202 or 204 and associated requirements 200 are provided in computer readable form. At step 310 the requirements are updated. Once the requirements 200 are updated, the initial NoC topology 202 or 204 becomes outdated. At step 320, the topology modification tool 230 combines the updated requirements 210 and the outdated existing NoC topology in a computer readable format.

At step 330, the topology modification tool 230 modifies the existing NoC topology 202 or 204 to fulfill the updated requirements 210. Each incremental modification includes minimizing a number of changes to existing components in the existing topology. Minimizing the changes includes preserving names of the existing components in the initial NoC topology.

At step 340 the updated NoC topology 232 is generated and provided, along with the updated requirements 210, in computer readable format 240.

Figure 4:
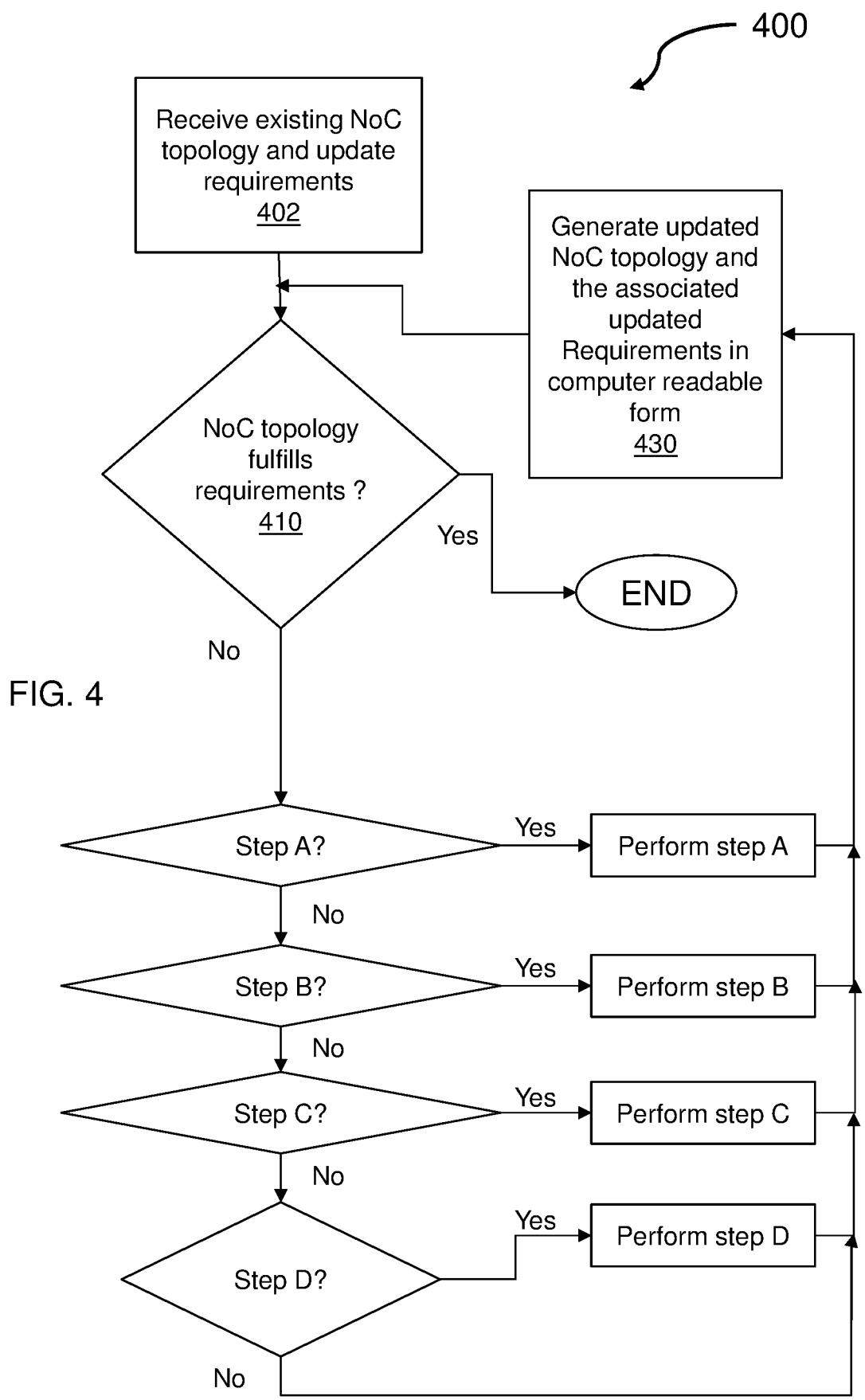
FIG. 4 shows a process for updating a NoC topology in accordance with various aspects and embodiments of the invention.

Referring additionally to FIG. 4, an example of the tool's process 400 for updating the NoC topology is shown. The process 400 is used by the tool 230 to update the NoC topology 202 or 204 in incremental steps and aligns the NoC topology 202 or 204 with the updated requirements 210. The number of steps depend on the type of update to the requirements. The number of steps shown and the order shown, in which these steps are executed or called, is but one non-limiting example. In some embodiments, the order of the steps may be changed. In some embodiments, there may be more steps (not shown).

At step 402, the topology modification tool 230 receives the outdated existing NoC topology 202 or 204 and the updated requirements 210 in computer readable format. At step 410, the tool 230 determines if the NoC topology 202 or 204 fulfills the updated requirements 210 or if there is an error (that is, the updated requirements 210 are not satisfied).

The tool 230 is responsible for deciding if the execution of a modification step A, B, C and/or D is required and which step is required. The tool's process 400 determines which of the steps A, B, C, and/or D are executed, in what combination, and in what order in order to fulfill the update requirements. Examples of steps A, B, C and D are described in greater detail below in accordance with the various aspects and embodiments of the invention.

At each step A, B, C, and D, the tool 230 takes the updated requirements and a NoC topology as input. Each step A, B, C and D uses the updated requirements and produces a (possibly) modified NoC topology as output. The generated NoC topology at the end of one step A, B, C or D might still not fulfill the updated requirements 210.

At block 430, a modified topology is generated after each step A, B, C and/or D is performed. In this manner, modification of the NoC topology is incremental.

If the modified NoC topology fulfils the updated requirements 210 (block 410), then the process is completed. The modified topology is outputted in computer readable form. The process 400 may be terminated if an error is detected at step 410, such as impossibility to fulfill the updated requirements completely.

A method herein offers an improvement over conventional NoC topology modification. Thus, minimized are delays and errors that result from incremental synthesis runs, such as two consecutive synthesis runs, when there is an update/new requirement. Consequently, cost and time of performing the modifications is reduced.

Figure 5:
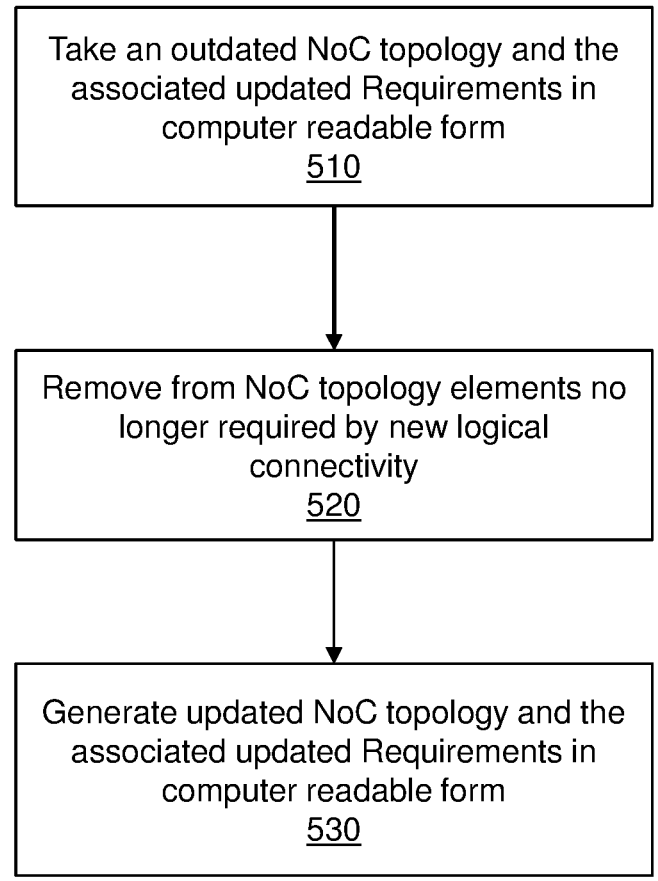
FIG. 5 shows a step of the process of FIG. 4 in accordance with various aspects and embodiments of the invention.

Referring now to FIG. 5, at step A of FIG. 4, the topology modification tool 230 examines the NoC elements and connections that are now outdated or useless due to the fact that the connectivity they implemented in the outdated NoC topology is no longer present in the updated requirements (blocks 510 and 520). The process removes the unnecessary elements. The tool 230 then generates and provides an updated NoC topology and the associated update requirements in a computer readable format (block 430 of FIG. 4).

Figure 6:
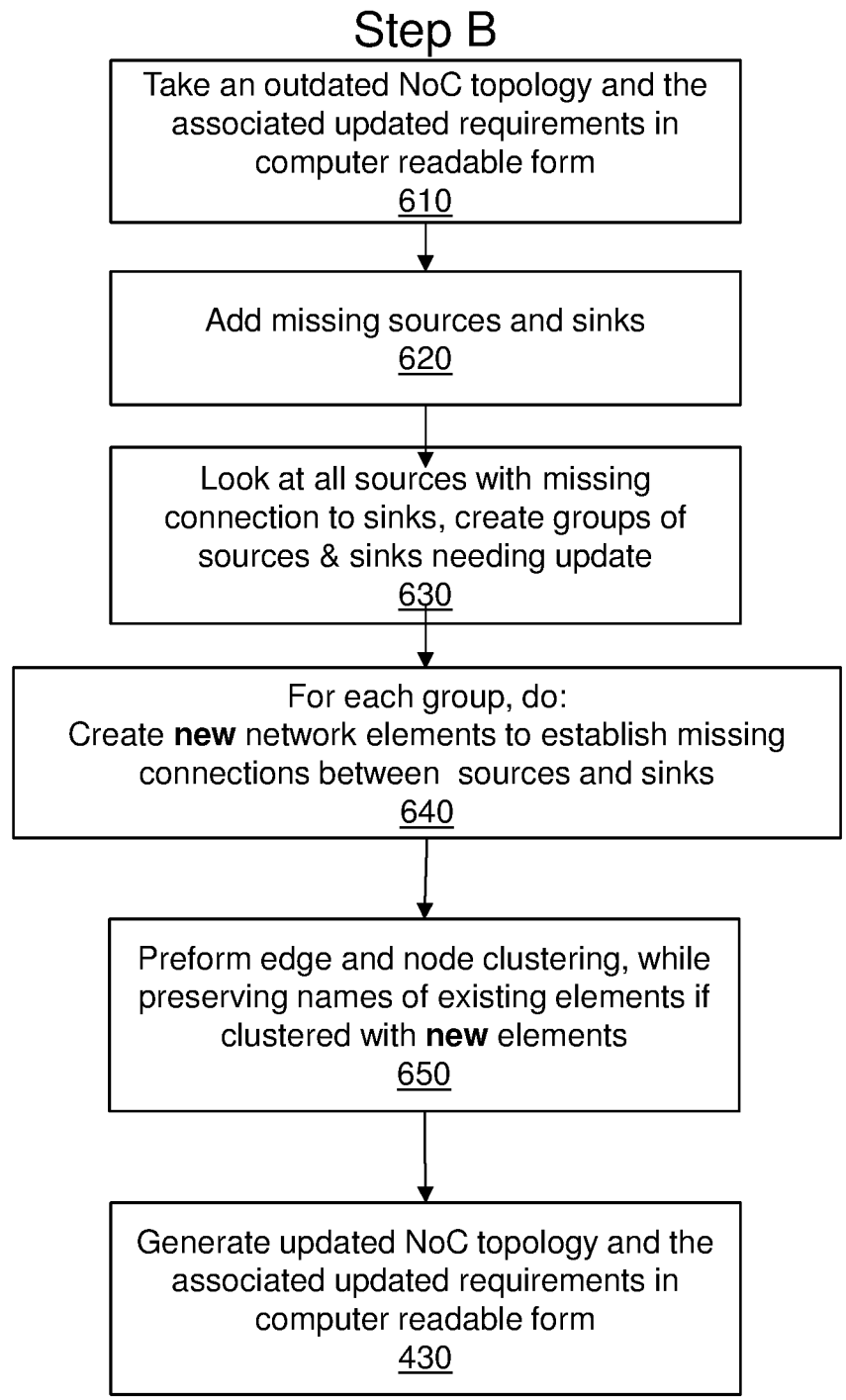
FIG. 6 shows a step of the process of FIG. 4 in accordance with various aspects and embodiments of the invention.

Referring now to FIG. 6, at step B of FIG. 4, the topology modification tool 230 considers NoC sources and sinks of traffic that are missing, and adds the missing sources and sinks to support the traffic (blocks 610 and 620).

In some instances, connection of the NoC to new initiators and/or new targets may require new NIUs, which are sources and sinks of traffic. Then, sources and destinations of traffics are examined and sources and destinations, which have missing connectivity, are grouped (block 630). A group may have as few as one element with missing connectivity. A group may have as many as all of the elements with missing connectivity. For each group of such elements with missing connectivity, new network elements are created, if needed, and new connections between elements are created, if needed (block 640). Newly created elements and connections are tagged as new. Elements not tagged as new are tagged as old.

The type or kind of new elements that might be created includes new switches. The kind of new connections that might be created includes connections between new switches, between new switches and old (existing) switches, and between old (existing) switches.

The topology modification tool 230 then performs node and edge clustering (block 650). Node clustering combines multiple NoC elements into one. For example, multiple switches might be combined into a single switch. Thus, step B ensures that if new switches are combined with old switches, the name of the resulting switch is chosen amongst the names of the old switches. Edge clustering combines multiple connections between NoC elements into one. When this occurs, step B ensures that if new switches are combined with old switches, which is due to the edge clustering process, the name of the resulting switch is chosen amongst the names of the old switches. Thus, step B preserves the maximum of old switches names, even if the old switches have new connectivity.

The tool 230 then generates and provides an updated NoC topology and the updated requirements in a computer readable format (block 430 of FIG. 4).

Figure 7:
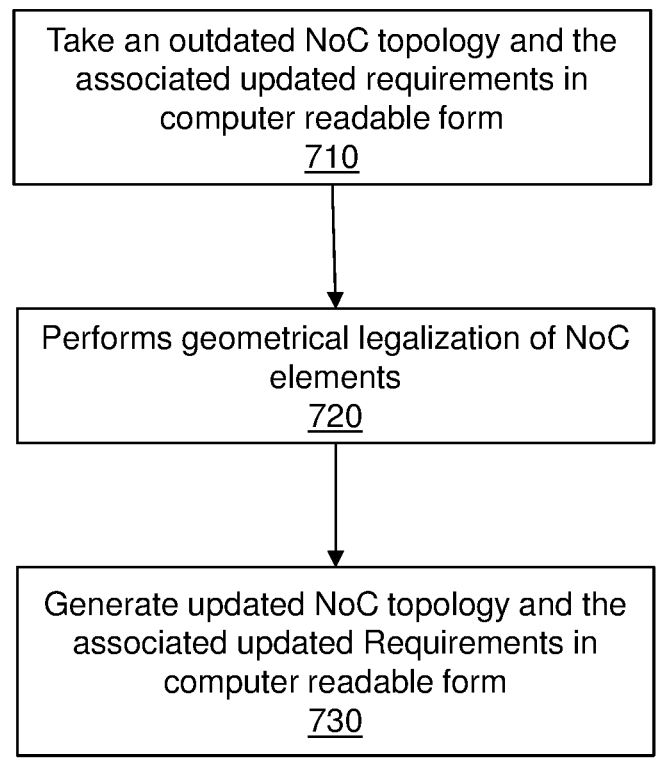
FIG. 7 shows a step of the process of FIG. 4 in accordance with various aspects and embodiments of the invention.

Referring now to FIG. 7, at step C of FIG. 4, the topology modification tool 230 examines the outdated NoC topology for illegal positions (block 710). Certain NoC elements may be at illegal positions of the floorplan due to changes of the floorplan. The elements at illegal positions are moved to legal locations (block 720). As an option (not shown), the topology modification tool 230 may attempt to minimize NoC wire lengths, which is the aggregated length of NoC connections between elements. The topology modification tool 230 then generates and provides an updated NoC topology and the update requirements in a computer readable format (block 430 of FIG. 4).

Figure 8:
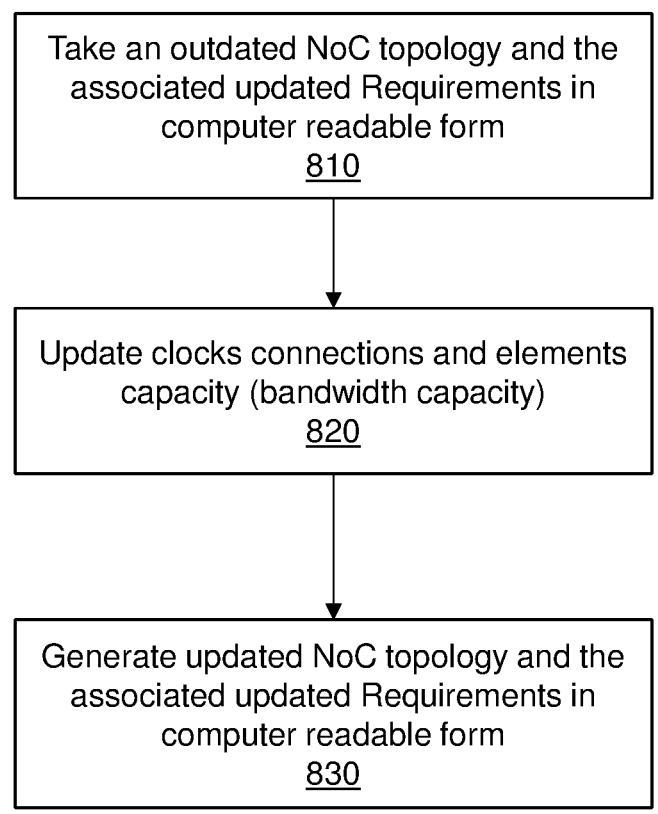
FIG. 8 shows a step of the process of FIG. 4 in accordance with various aspects and embodiments of the invention.

Referring now to FIG. 8, at step D of FIG. 4, the topology modification tool 230 updates timing of existing NoC elements. For instance, changes the way the NoC elements are connected to a clock and updates the configuration to fulfill the updated requirements. The connection of NoC elements to a clock (NoC elements have a clock input because they are built with digital logic components) and NoC element configurations, such as the width of the packets FLITS they carry, is updated to adapt the NoC performances to the updated requirements (blocks 810 and 820). The NoC performance metrics considered are the ones described in the updated requirements. A non-limiting example of such a requirement is minimum bandwidth between a source and a sink in a certain traffic scenario. Another non-limiting example is gate count. Another non-limiting example is power consumption. The topology modification tool 230 then generates and provides an updated NoC topology and the update requirements in a computer readable format (block 430 of FIG. 4).

In some aspects and embodiments, the tool's process may be used to for only sub-sections of the NoC.

Certain methods herein may be performed by instructions that are stored upon a non-transitory computer readable medium. The non-transitory computer readable medium stores code including instructions that, if executed by one or more processors, would cause a system or computer to perform steps of a method described herein. Examples of the non-transitory computer readable medium include a rotating magnetic disk, a rotating optical disk, a flash random access memory (RAM) chip, and other mechanically moving or solid-state storage media.

Certain examples have been described herein and it will be noted that different combinations of different features from different examples may be considered. Salient features are presented to better explain examples; however, it is clear that certain features may be added, modified and/or omitted without modifying the functional aspects of these examples as described.

As for the NoC, examples of IP elements or units include processors (e.g., CPUs or GPUs), random-access memory (RAM—e.g., off-chip dynamic RAM or DRAM), a network interface for wired or wireless connections such as ethernet, WiFi, 3G, 4G long-term evolution (LTE), 5G, and other wireless interface standard radios. The IP may also include various I/O interface devices, as needed for different peripheral devices such as touch screen sensors, geolocation receivers, microphones, speakers, Bluetooth peripherals, and USB devices, such as keyboards and mice, among others.

Some examples are one or more non-transitory computer readable media arranged to store such instructions for methods described herein. Whatever machine holds non-transitory computer readable media comprising any of the necessary code may implement an example. Some examples may be implemented as physical devices such as semiconductor chips; hardware description language representations of the logical or functional behavior of such devices; and one or more non-transitory computer readable media arranged to store such hardware description language representations. Descriptions herein reciting principles, aspects, and embodiments encompass both structural and functional equivalents thereof. Elements described herein as coupled have an effectual relationship realizable by a direct connection or indirectly with one or more other intervening elements.

Practitioners skilled in the art will recognize many modifications and variations. The modifications and variations include any relevant combination of the disclosed features. Descriptions herein reciting principles, aspects, and embodiments encompass both structural and functional equivalents thereof. Elements described herein as "coupled" or "communicatively coupled" have an effectual relationship realizable by a direct connection or indirect connection, which uses one or more other intervening elements. Embodiments described herein as "communicating" or "in communication with" another device, module, or elements include any form of communication or link and include an effectual relationship. For example, a communication link may be established using a wired connection, wireless protocols, near-filed protocols, or RFID.

To the extent that the terms "including", "includes", "having", "has", "with", or variants thereof are used in either the detailed description and the claims, such terms are intended to be inclusive in a similar manner to the term "comprising."

The scope of the invention, therefore, is not intended to be limited to the exemplary embodiments shown and described herein. Rather, the scope and spirit of present invention is embodied by the appended claims.

What is claimed is:

1. A computer-implemented method for generation of an updated topology, the method comprising:

receiving an update to an initial Network-on-Chip (NoC) topology, wherein the update results in updated requirements to initial requirements of the NoC;

modifying a portion of the initial NoC topology that is impacted by the update in order to satisfy the update and generate an incremental updated NoC topology resulting in an incremental modification of the NoC in response to the update by changing existing components in the initial NoC topology, which becomes outdated and results in at least one of an unnecessary element and an unnecessary connection;

removing at least one of the unnecessary element and the unnecessary connection;

generating an updated NoC topology that combines the initial NoC topology with the incremental updated NoC topology that satisfies the update; and providing a computer readable format of the updated NoC topology thereby minimizing delays and costs resulting from topology modifications.

* * * * *